Feb. 14, 1939.   G. F. HUMPHREY   2,147,098
ARTICLE OF FOOD
Filed Jan. 15, 1938   2 Sheets-Sheet 1
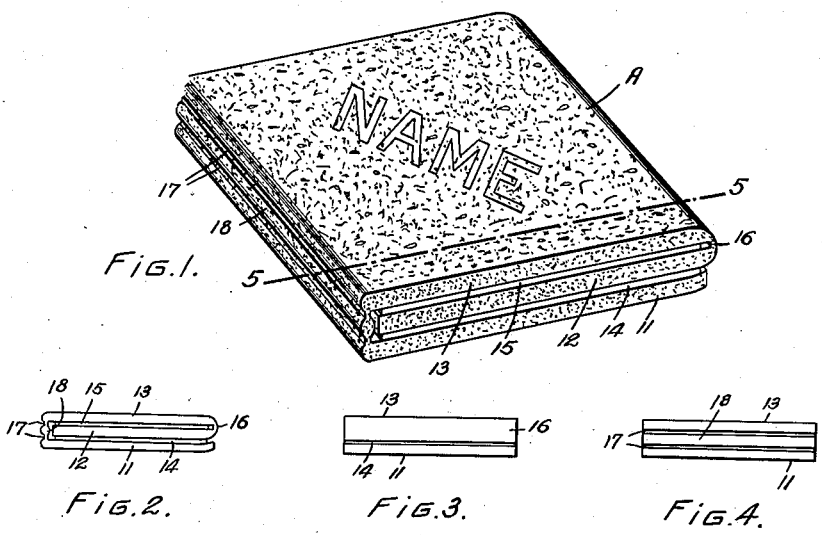
Fig.1.   Fig.2.   Fig.3.   Fig.4.
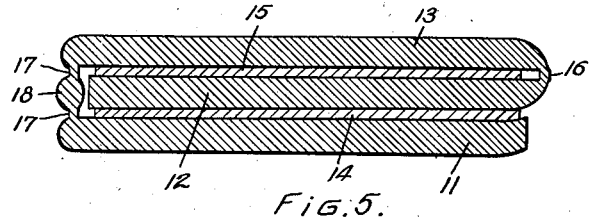
Fig.5.
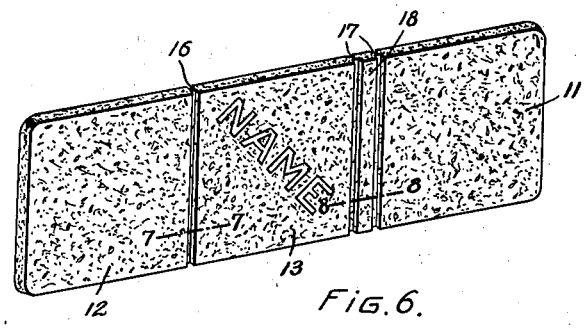
Fig.6.
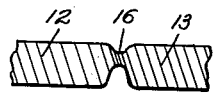 
Fig.7.   Fig.8.
Inventor
George F. Humphrey
By
Attorneys.

Feb. 14, 1939.  G. F. HUMPHREY  2,147,098
ARTICLE OF FOOD
Filed Jan. 15, 1938   2 Sheets-Sheet 2

Inventor
George F. Humphrey
By
Attorneys.

Patented Feb. 14, 1939

2,147,098

UNITED STATES PATENT OFFICE 2,147,098

ARTICLE OF FOOD

George F. Humphrey, Montreal, Quebec, Canada, assignor to Tridek Corporation, a corporation of Quebec, Canada Application January 15, 1938, Serial No. 185,238
In Canada June 13, 1936

7 Claims. (Cl. 99—90)

This invention relates to an improved article of food and to a method of producing this article.

A main object of the invention is to provide a multiple-layer article of food of the "sandwich" category featured by its novel form, compactness and stability and including integral connections for holding the layers together.

A further object of the invention is to provide an article of this nature in which a staple and economical element of food is combined with relishing ingredients in such a manner as to provide an attractive product particularly appealing and appetizing, and convenient to handle while being eaten in the fingers or otherwise.

Another object of the invention is to provide an article of this nature in the manufacture of which an economy of ingredients may be made as compared with analagous articles.

A still further object of the invention is to provide an article of this nature which may be more easily and sanitarily assembled than a multiple layer sandwich, this object including the provision of a method of assembly in which the handling of the ingredients may be accomplished largely by mechanical means so as to realize the major advantages of the product.

With these and other objects in view the invention consists essentially of an article of food comprising three juxtaposed foundation layers of bread or similar food material hinged together by thin integral webs of the same material but of a denser consistency, the layers adapted to contain between them interjacent layers of relishing filling.

In a preferred mode of assembling this article a thin elongated slice of bread is first cut lengthwise from a suitable loaf. This slice is then compressed along narrow transversely extending areas to provide suitable web-like portions demarcating on the slice three integrally connected sections hinged together by narrow pliable web-like joints. The slice is thus made into a blank adapted to form the foundation layers of the article. A sandwich filling is then placed over the central section, and an end section infolded, about one of the joints provided for this purpose, over the central section to enclose the filling. More sandwich filling is then place on top of the infolded end section and the remaining end section infolded about the joint to enclose the second filling. The three sections thus provide juxtaposed foundation layers containing between them relishing filling.

After the folding operations pressure is applied transversely to the plane of the layers to urge them to assume and retain a compacted juxtaposed relationship. Then the article is preferably grilled under the light pressure of hot plates bearing upon the surfaces of the outside layers, these layers acquiring as a result a characteristic denser consistency and crispness.

Having thus generally described the nature of the invention, reference will now be made to the accompanying drawings illustrating preferred forms of the invention in which:

Figure 1 is a top perspective view of an article of food according to the present invention.

Figure 2 is a reduced side elevation of the article shown in Figure 1.

Figure 3 is a reduced elevation of one end of the article shown in Figure 1.

Figure 4 is a reduced elevation of the other end of the article shown in Figure 1.

Figure 5 is a vertical cross section taken along the line 5—5 of Figure 1.

Figure 6 is a bottom perspective view of a blank suitable for forming the foundation layers of the article shown in Figure 1.

Figure 7 is an enlarged cross section taken on line 7—7 of Figure 6.

Figure 8 is an enlarged cross section taken on line 8—8 of Figure 6.

Figure 9:
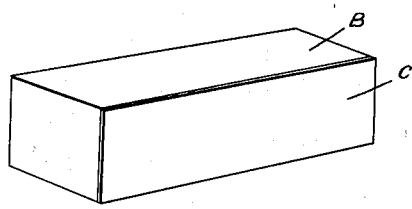
Figures 9 to 16 are diagrammatic perspective views of reduced size illustrating a preferred series of steps in the assembly of the article shown in Figure 1.
Figure 10:
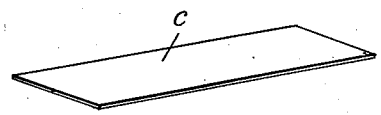
Figure 11:
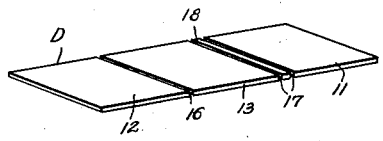

A detailed description will now be given with more specific reference to the drawings. A preferred form of article according to the invention is indicated by A. The article A is made up of a continuous structure comprising three juxtaposed integrally connected bread layers 11, 12 and 13, the layers 11 and 13 being outside layers, the layer 12 being interjacent to them. A layer 14 of relishing filling intervenes the layers 11 and 12 and another layer 15 of relishing filling intervenes the layers 12 and 13.

The adjacent ends of the layers 12 and 13 are connected by an integral compressed pliable web 16 as shown in detail in Figures 1 and 2. The adjacent ends of the layers 11 and 13 are connected by a link spanning the thickness of the interjacent layer 12 and made up of thin spaced apart compressed web portions 17, connected by a thicker portion 18. The layers 11, 12 and 13 are thus connected in series and lie in compacted juxtaposed relationship with the fillings 14 and 15 between them, the integral links between the layers holding them in position. An advertising inscription 19 appears on the surface of the layer 13 in the form of depressed characters.

The article A is compact and convenient to handle as the component layers are joined together and thus prevented from becoming separated during consumption. The fillings are securely "sandwiched" between the adjacent layers there being only one end opening even though the article has three foundation layers. The flexible webs permit partial separation of the layers 11, 12 and 13 for rearrangement of the relishing fillings. Moreover, the appearance of the article is attractive and novel.

A preferred method of assembling the article A is diagrammatically illustrated in Figures 9 to 16, in which for convenience the foregoing reference numerals denote corresponding parts. According to this method a slice C is cut longitudinally from an elongated loaf of bread B. A blank D suitable for forming the foundation layers of the article A is then made by subjecting the slice C to an operation in which a single and a pair of narrow transverse portions thereof are compressed to form the thin compressed webs 16 and 17 with complementary depressions locating on the slice three substantially equal sections 12, 13 and 11, adapted to form the foundation layers of the article A. An uncompressed portion 18 remains between the webs 17 forming therewith a connecting link of sufficient width to span the thickness of the interjacent slice 12.

The blank D may be formed as aforesaid in any suitable manner preferably by compression of the slice C between a ribbed and a flat plate, the ribs being suitably positioned and shaped to provide the type of webs desired. The ribbed plate may also be provided with a protruding design or letters making up any desired inscription so that concurrently with the ribbing operation the design or letters will die an inscription upon the blank D. It is preferable that the ribs be sufficiently deep and that sufficient pressure be applied for the webs 16 and 17 to be made quite thin and of a doughy or rubbery consistency by reason of the changed state of the compressed bread forming them.

Figure 12:
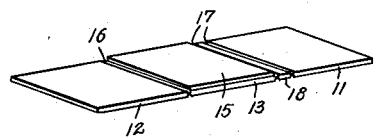
Figure 13:
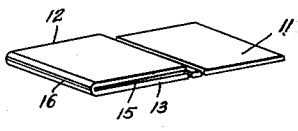
Figure 14:
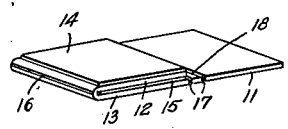
Figure 15:
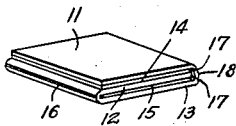
Figure 16:
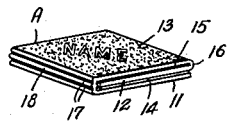

As a next step in this preferred mode of assembly the layer 15 of edible filling is placed upon the section 13 as diagrammed in Figure 12. The section 12 is then infolded about the web 17 as a hinge to lie in juxtaposed relationship to the section 13 to form the interjacent foundation layer of the article A. Another layer 14 of relishing filling is then placed upon the layer 12 as shown in Figure 14 and the section 11 infolded about the webs 17, as shown in Figure 15, to lie in juxtaposed relationship to the layer 12. The portion 18 spans the width of the interjacent layer 12. The article A is now assembled and ready for grilling. In final form it is placed with the face of the layer 13 in view to reveal any design that has been died thereupon.

In the described manner of assembly, the form of the webs 16 and 17 and their function as hinges are particularly important in overcoming difficulties encountered in folding a slice of bread or similar material. The consistency of bread either fresh or stale is not such that it can be slice form be readily folded without crumbling, especially adjacent the outside of the fold.

The bread of the webs 16 and 17, being compressed, is dense and of a doughy consistency rendering it pliable and easily flexed to permit the folding operations above described. Moreover, the webs allow an even fold to be produced. Furthermore, it is desirable that these webs are formed adjacent the surface of the slice C falling on the inside of the fold so that there is no bulking of material adjacent the crease or fold.

When the depressions are made on one surface of the slice C by an instrument working against this face while the other face of the slice bears against a flat surface, there is a tendency for the bread material forming the webs to sink slightly below the latter surface as shown in Figures 7 and 8. This does not affect the efficiency of the links 16 and 17 in fulfilling their function.

The nature of this method of assembly of the article A results in several advantages. For instance only a single slice of bread need be handled and much of the difficulty of cutting and positioning separate slices and retaining in compact relationship in a multiple layer sandwich is avoided. The webs provided for the purpose automatically locate the folding lines so that no difficulty is experienced in positioning respective layers. Moreover, owing to the integral nature of the finished article the original slice may be cut thinner than if detached slices were being used. Through these advantages the method leads itself to being carried out by mechanical means.

After the article A has been assembled as above described it may be toasted or grilled to add to its tastiness and appearance. This is preferably accomplished between two heated plates exerting light inward pressure upon its outerlayers 11 and 13. This pressure during toasting or grilling tends to compress the component layers slightly, giving these layers a characteristic pressed consistency, different from that of ordinary toast so that the palatability of the article is improved. The toasting operation also serves to stiffen the webs 16 and 17 to a relatively harder consistency such as that of pastry so that the respective layers 11 and 12 and 13 are held stably in juxtaposed relationship for the convenience of the consumer while the product is being eaten.

When this preferred form of the product is presented to the consumer for sale, section 13 becomes the top layer of the article which is viewed by the consumer. When an impression has been made on the surface of this layer prior to toasting the depressed portion is of a contrasting whiteness to the toasted surface and thus more clearly visible.

Figure 17:
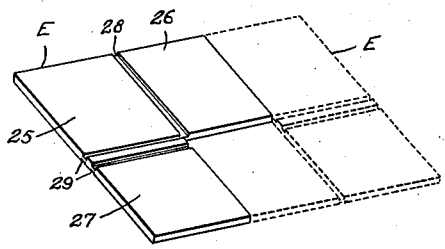
Figure 17 is a diagrammatic perspective view of a form of blank suitable for use in assembling an alternate form of article according to the present invention, a twin blank being shown in dotted lines to complete with the first blank a full slice of regular outline.

While a preferred form of the invention has been described, as one which is believed to be most convenient for production purposes, it is conceivable that the article might be made in other forms also highly acceptable to the consumer. For instance, in Figure 17 is illustrated a somewhat L shaped blank E suitable for making a unit of an article according to an alternate form of the invention. A twin blank E is shown adjacent this blank in dotted lines to make up a slice which could be cut from a loaf of regular shape formed especially for this purpose.

The blank E is made up of a rectangle 23 adjoining adjacent sides of which are sections 26 and 27 connected thereto by webbed links 28 and 29 respectively. An article generally similar to the article A is formed by inturning the sections 28 and 29 over the central section 25 to enclose intervening relishing filling.

Figure 18:
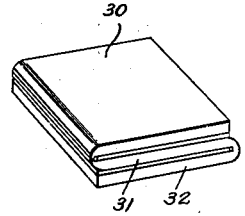
Figure 18 is a diagrammatic illustration of another form of article according to the present invention.

In Figure 18 is illustrated an alternate form of article according to the present invention comprising integrally connected sections 30, 31, and 32 juxtaposed as shown to form the foundation layers of the article, only in this case the end sections 30 and 32 become the outside layers, instead of an end layer and a central layer as in the article A. In this modified form of article single links only are required to connect the respective sections and slight modifications should be made in their application to the slice to form a blank corresponding in purpose to the blank D.

Figure 19:
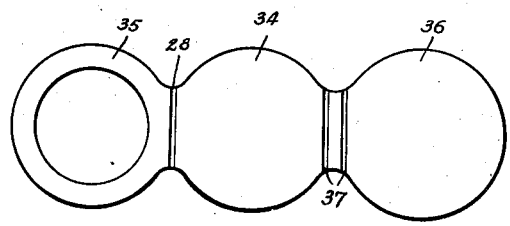
Figure 19 is a diagrammatic perspective view of a form of blank suitable for making a still further form of article according to the present invention.

Figure 19 illustrates a blank suitable for assembling a round article according to the present invention. This blank comprises a central section 34, and end sections 35 and 36 hinged thereto by links 37 and 38. The section 35 is provided with a central opening 39 so that when infolded over the section 34 it will form therewith an edible container for filling, the portion remaining around the opening 39 forming the walls of the container. It is particularly convenient when the filling is a round article such as for instance a fried egg, or a hamburger steak. A central opening such as 39 of any shape may be used in rectangular forms of articles. In a like manner articles of any desired shape may be assembled.

In the above description the many advantages of the present invention will become evident. With the rapid growth of the "quick-lunch" counter and the "hot dog" stand, articles quickly assembled and convenient to eat are particularly acceptable especially when nourishing and sanitary as in the present case. In some respects this particular article may be compared with a multiple-layer sandwich but has natural advantages thereover owing to the fact that its layers are integrally connected and therefore stably positioned and not easily dislodged during consumption. Moreover, owing to its particular manner of assembly, thinner bread layers may be utilized and economy of this material made. Furthermore, the handling of an integral slice which becomes a blank and folding this blank into a sandwich may be accomplished with less manual contact by the operator than would be the case were he assembling a multiple deck sandwich from three separate layers.

While several preferred embodiments of the invention have been disclosed it is understood that others fall within the scope of the invention and of the accompanying claims. A three-layer article has been dealt with specifically but articles embodying a different number of layers may be made according to the structure and methods disclosed. Therefore, the foregoing is to be taken only as constituting the essential and distinctive thought of the present invention, which may be modified or combined with various other details within the purview of the accompanying claims.

I claim:

1. A blank for use in assembling a multiple layered article of food comprising an elongated slice of bread, said slice being provided with a plurality of narrow tranverse webs formed by pressing the slice adapted to act as hinges to permit folding of the slice, one of said webs spaced from an end of said slice and an adjacent pair of said webs being spaced from the other end of said slice so as to demarcate three integrally connected sections, said pair of webs being spaced apart and joined by a narrow integral link so as to form between two of said sections a joint of sufficient width to span the thickness of the remaining section on folding of the slice, said webs being formed of compressed material of the slice of a doughy pliable consistency.

2. A blank for forming an article of food comprising a lengthy slice of bread provided with pliable tranverse webs demarcating on said slice three substantially equal sections integrally joined together by the webs of less thickness than the sections and formed by pressing upon the slice, said webs being closer to one surface of the slice than to the other surface, the end sections adapted to be infolded about the webs in the direction of said first mentioned surface to lie in juxtaposed relationship to each other and to the intermediate section.

3. As an article of manufacture an extensive blank of bread having two end sections and an intermediate section connected by integral flexible webs, one end section having an opening therein, said end sections adapted to be infolded over the intermediate section to enclose an edible filling.

4. A food product comprising an elongated slice of bread folded upon itself to provide three superimposed integrally connected sections, the intermediate section being provided with a central opening and a sandwich filling confined between the opposing surfaces of the outer sections and the intermediate section.

5. A blank for forming an article of food comprising a slice of bread provided at intervals with pliable transverse webs produced by pressing the bread to form the webs of less thickness than the thickness of the bread, said webs demarcating on said slice sections integrally joined together by the webs, the end sections adapted to be infolded about the webs over the intermediate section to form foundation layers for containing therebetween edible fillings, the demarcation of two of said sections created by the web portion joining the same being of greater area than another web portion and substantially of a dimension to span the thickness of the intermediate section.

6. A food product comprising an elongated slice of bread folded upon itself to provide superimposed integral connected sections, an edible filling intervening the sections and integral transversely extending webs connecting adjacent ends of the sections, said webs being of less thickness than said sections and formed by pressing the same, the web between two of said sections being of greater area than that of another web and substantially of a dimension to span the thickness of the intermediate section.

7. A food product comprising an elongated slice of bread folded upon itself to provide superimposed integral connected sections, and edible filling intervening the sections and integral transversely extending joints connecting adjacent ends of the sections, said joints being of less thickness than said sections and formed by pressing the same, one of said joints having a pair of webs and an intermediate portion of greater thickness than that of the webs defining a link.

GEORGE F. HUMPHREY.